United States Patent [19]

Rudnik

[11] Patent Number: 4,571,098
[45] Date of Patent: Feb. 18, 1986

[54] CARRIER BEARING ASSEMBLY

[76] Inventor: Everett Rudnik, 49750 Highway 24, Burlington, Colo. 80807

[21] Appl. No.: 714,170

[22] Filed: Mar. 20, 1985

[51] Int. Cl.[4] ............................................. F16C 27/06
[52] U.S. Cl. ..................................... 384/474; 384/536; 384/537
[58] Field of Search ............... 384/474, 536, 510, 537, 384/584, 582

[56] References Cited

U.S. PATENT DOCUMENTS

| | | | |
|---|---|---|---|
| 4,010,987 | 3/1977 | Jasperse et al. | 384/474 |
| 4,106,827 | 8/1978 | Ducret et al. | 384/537 |
| 4,154,490 | 5/1979 | Kohler et al. | |
| 4,304,446 | 12/1981 | Goodine | |
| 4,428,630 | 1/1984 | Folger et al. | |
| 4,463,993 | 8/1984 | Brissette et al. | 384/536 |
| 4,489,992 | 12/1984 | Brandenstein et al. | 384/536 |

Primary Examiner—Lenard A. Footland
Attorney, Agent, or Firm—Sheridan, Ross & McIntosh

[57] ABSTRACT

A carrier bearing assembly is provided which is used with vehicles having two separate drive shaft sections. The carrier bearing assembly supports and interconnects the two drive shaft sections. The carrier bearing assembly includes a housing comprising two separate casings which are mounted about an outer race. Ball bearings are disposed between the outer race and an inner race. A pair of sleeve members and a pair of seal members are also provided, with one sleeve member and one seal member located on each side of the ball bearings. The sleeve members, together with the drive shaft sections, are rotatable relative to the first and second casings. One of the two casings includes a port formed therein and a grease fitting is inserted into the port. A lubricant is provided through the grease fitting into the housing formed by the two casings. The lubricant acts to increase the life of the carrier bearing assembly thereby virtually eliminating replacement of the carrier bearing assembly.

8 Claims, 3 Drawing Figures

4,571,098

CARRIER BEARING ASSEMBLY

FIELD OF THE INVENTION

The present invention relates to carrier bearings and, in particular, to a carrier bearing assembly configured to permit lubrication of its bearing assembly.

BACKGROUND INFORMATION

In relatively smaller trucks and larger sized passenger vehicles including vans, it is common to use a carrier bearing situated along the drive shaft to support and interconnect two separate portions of the drive shaft. The drive shaft is comprised of two separate portions to reduce vibrations that would result if only a single relatively long drive shaft were employed. The carrier bearing then is positioned to receive one end of the first drive shaft portion and one end of the second drive shaft portion to interconnect the two together. However, the carrier bearings presently in use have suffered from the problem of relatively rapid wear. As a consequence, the carrier bearing must be replaced during the life of the vehicle. A primary cause of wear in the carrier bearing is the inability to provide proper and sufficient lubrication to the bearings. In carrier bearing assemblies prior to the present invention, no mechanism was provided to permit lubrication thereof. The present invention overcomes this deficiency to permit ready access to the bearings for lubrication thereof. In so doing, the present invention provides a housing configuration for securely containing the bearings yet allowing for lubrication.

SUMMARY OF THE INVENTION

A carrier bearing assembly is provided and held in a rubber mounting. A clamp assembly surrounds portions of the rubber mounting and is attached to the frame of the vehicle. The carrier bearing assembly itself includes a housing that comprises two separate casings. Each of the two casings is formed with a recess. Each of the two recesses receives and contacts a portion of a bearing assembly. The bearing assembly includes an outer race and an inner race spaced from and concentric with the outer race. Ball bearings are disposed between the outer race and the inner race. Each of the ball bearings is contained in a ball bearing housing. The ball bearings permit relative rotation between a pair of sleeve members and the two casings. Each of the two sleeve members includes an inner element and an outer element. The diameter of the inner element of each sleeve member is of a size to receive and hold one end of one of two drive shaft sections. The outer element of each sleeve member has a greater thickness than the inner element so that the outer element can be struck by the installer when locating the carrier bearing assembly on the two drive shaft sections. The carrier bearing assembly also includes a pair of seal rings that are positioned on opposite sides of the carrier bearing housing. Each of the seal rings is disposed between one of the casings and the outer element of a sleeve member. The seal rings prevent the escape of lubricant from and the entry of contaminants into the bearing assembly. At least one of the two casings includes a port for providing communication through the casing to the ball bearings. A grease fitting is sealingly attached to the port and adapted to receive lubricant for passage to the ball bearings.

Based on the foregoing description, a number of worthwhile advantages of the present invention are readily discerned. A carrier bearing assembly is provided which permits lubrication of the ball bearings while the carrier bearing assembly supports and interconnects two sections of a drive shaft. As a result, the carrier bearing assembly, with proper lubrication, can last the life of the vehicle to which it is installed. The housing of the carrier bearing assembly is effectively formed of two separate casings for surrounding an outer race. In such a manner, a readily accessible housing is provided to receive and contain lubricant through a grease fitting. Further, in view of the reduced complexity of the design, the relatively longer lasting carrier bearing assembly of the present invention is easily manufactured and inexpensive to produce.

Additional advantages of the present invention will become readily apparent from the following discussion, when taken in conjunction with the accompanying drawings.

DETAILED DESCRIPTION OF THE PREFERRED EMBODIMENT

Figure 1:
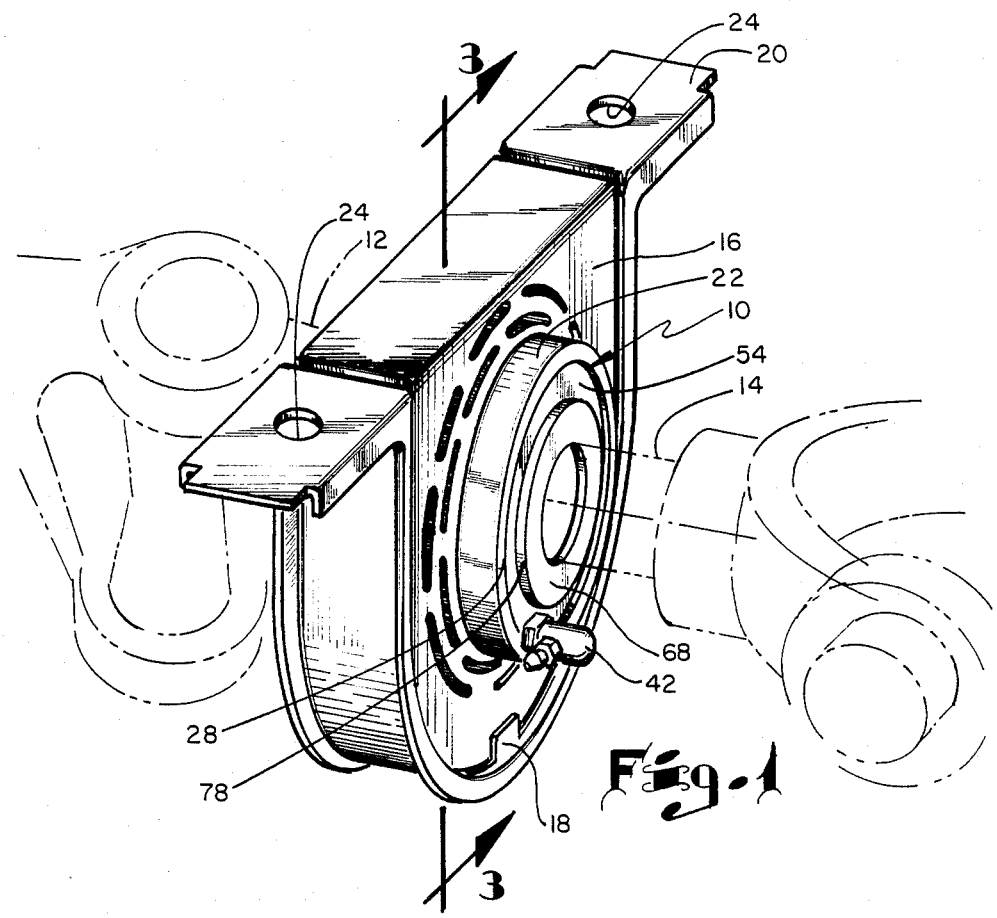
FIG. 1 is a perspective view of the assembled carrier bearing assembly of the present invention mounted for connection to a vehicle to support drive shaft sections.

In accordance with the present invention, a carrier bearing assembly 10 is provided for supporting and interconnecting a pair of drive shaft sections 12, 14. A first drive shaft 12 is connected to the engine of a vehicle through a transmission while the second drive shaft section 14 is connected to the driven wheels of the vehicle through a U-joint. The two drive shaft sections 12, 14 are typically used on vehicles that otherwise would have a relatively long shaft between the transmission and U-joint. The use of the two drive shaft sections 12, 14 results in the reduction of unwanted vibrations which would result in the case of a single, relatively long drive shaft. The carrier bearing assembly 10 has particular application with small pickup trucks and vans. The carrier bearing assembly 10 is received and held in a rubber mounting 16 using clips or tabs 18 provided on a clamp assembly 20. Preferably, one clip 18 is located on each side of the clamp assembly 20 at the apex or valley of the U-shaped member of the clamp assembly 20. As can be seen in FIG. 1, the rubber mounting 16 is surrounded along its exterior surface by the clamp assembly 20 and includes a flange 22 formed integral with the remaining portions of the rubber mounting 16 and extending outwardly from the major plane thereof. The clamp assembly 20 is used to attach the carrier bearing assembly 10 and the rubber mounting 16 to the frame of the vehicle by conventional means, such as fasteners inserted through holes 24.

Figure 2:
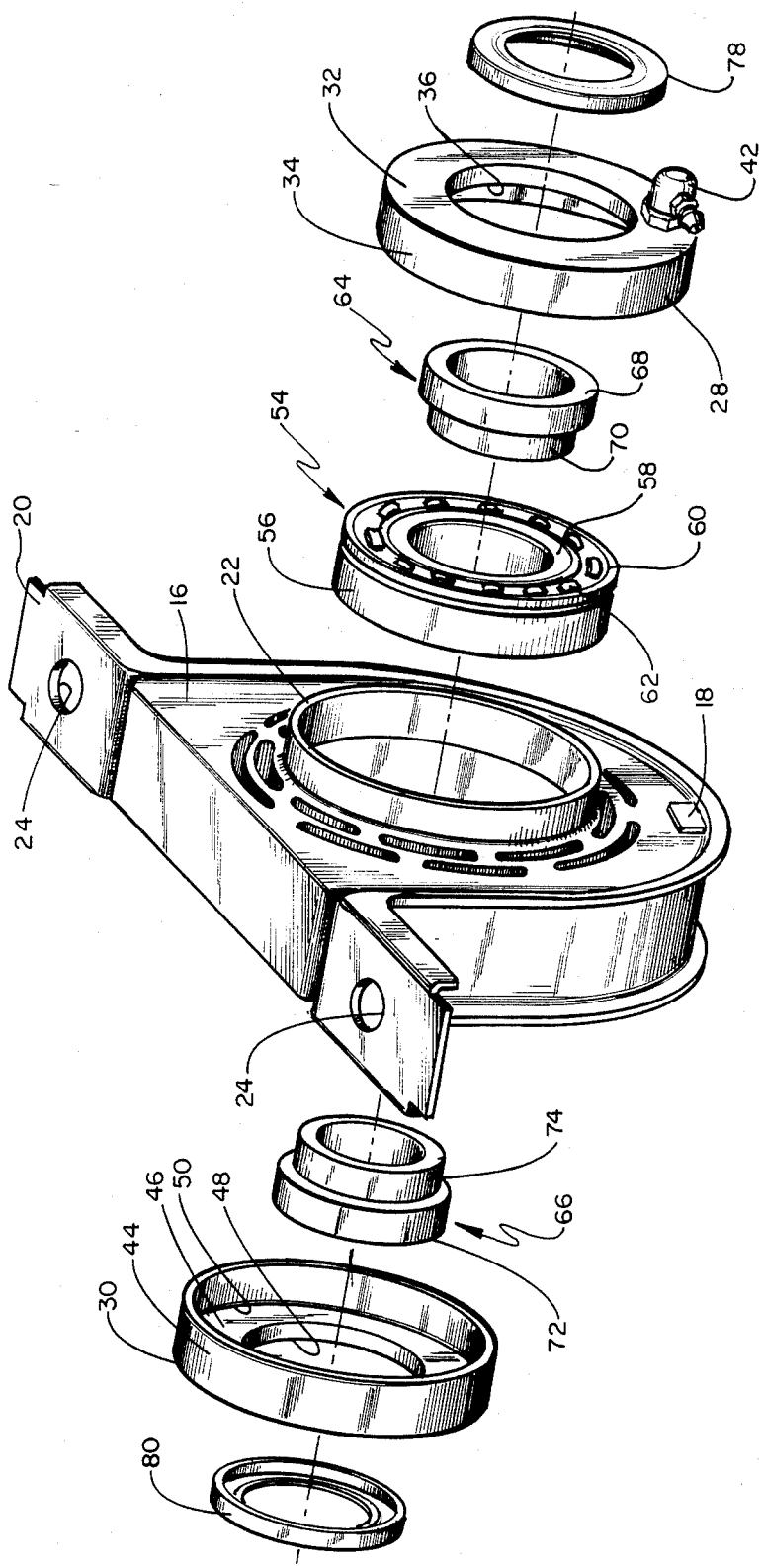
FIG. 2 is an exploded view of the parts of the carrier bearing assembly of the present invention.

The carrier bearing assembly 10 is discussed in greater detail with reference also to FIGS. 2 and 3. The carrier bearing assembly 10 includes a housing 26 comprised of a first casing 28 and a second casing 30. The first casing 28 includes a cylindrical wall 32 and an annular member 34. A bore 36 is defined by the annular member 34. The cylindrical wall 32 and the annular member 34 together define an open space or recess 38.

The first casing 28 also has a port 40 formed through the annular member 34. A grease fitting or zirc 42 is connected to the port 40 by threadably engaging a portion of the zirc 42 to the annular member 34. The second casing 30 is identical to the first casing 28 except that the second casing 30 does not require a port and a zirc. Specifically, the second casing 30 includes a cylindrical wall 44 and an annular member 46 formed integrally therewith. A bore 48 is defined at the center portion of the annular member 46. An open space or recess 50 is defined by the combination or interconnection of the cylindrical wall 44 and the annular member 46.

The carrier bearing assembly 10 also includes a ball bearing assembly 54 comprising an outer race 56 and an inner race 58. The inner race 58 is spaced from the outer race 56 a desired distance and is concentric therewith. A ball bearing unit 60 is positioned between the outer race 56 and the inner race 58. The ball bearing unit 60 includes a ball bearing housing 62 formed, in one embodiment, by a number of interconnected rings, each of which act as a housing for one ball bearing. Each of the ball bearings is able to contact the inner surface of the outer race 56 and the outer surface of the inner race 58.

A pair of sleeve members 64, 66 are also provided in the preferred embodiment of the carrier bearing assembly 10. The first sleeve member 64 includes an outer element 68 and an inner element 70. The outer element 68 and the inner element 70 comprise an integral, one-piece member with the outer element 68 having a greater thickness than the inner element 70. Similarly, the second sleeve member 66 includes an outer element 72 and an inner element 74. The outer element 72 and the inner element 74 together form an integral, one-piece member with the outer element 72 having a greater thickness than the inner element 74. Lastly, the carrier bearing assembly 10 includes a pair of sealing rings 78, 80. Each of the two sealing rings 78, 80 preferably includes a rubber ring portion used in sealing the ball bearing assembly 60.

Figure 3:
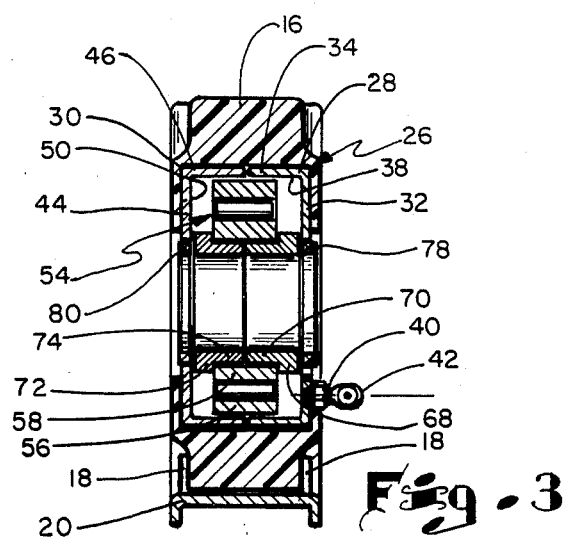
FIG. 3 is a longitudinal cross-sectional view, taken along lines 3—3 of FIG. 1, showing the interconnection of the parts of the carrier bearing assembly.

In connection with the interconnection of the various parts of the carrier bearing assembly, reference is particularly made to FIG. 3. As can be seen, the carrier bearing assembly 10 is positioned within the rubber mounting 16 including the flange 22. The first casing 28 surrounds a portion of the surface of the outer race 56. In particular, the recess 38 formed by the cylindrical wall 32 and the annular member 34 receives a portion of the outer surface of the outer race 56. Likewise, the recess 50 of the second casing 30 receives the remaining portion of the outer surface of the outer race 56. Preferably, each of the two casing recesses 38, 50 receives one-half of the outer surface of the outer race 56. The sleeve member 64 is inserted into and held by the inner race 58. More specifically, the inner element 70 contacts one-half of the inner surface of the inner race 58 and an engaging surface of the outer element 68 of the first sleeve 64 abuts against a side wall of the inner race 58. Similarly, the second sleeve member 66 is inserted to and held by the inner race 58 at the side of the carrier bearing assembly 10, opposite that side having the first sleeve member 64. In particular, the inner element 74 of the second sleeve member 66 contacts the remaining one-half portion of the inner surface of the inner race 58 while the outer element 72 extends outwardly away from the inner race 58 and abuts against the wall of the inner race 58. As can be seen when assembled, the end surface of the first sleeve member 64 contacts the end surface of the second sleeve member 66.

Finally, the seal member or ring 78 is disposed between the cylindrical wall 32 and the outer rim or surface of the outer element 68 of the first sleeve member 64. Preferably, the rubber portion of the seal member 78 is adjacent to and contacts the outer surface of the outer element 68. In such a manner, the seal member 78 prevents the passage of dirt or other contaminants into the interior of the carrier bearing assembly 10 and also prevents the escape of lubricant from the ball bearing assembly 60. Likewise, the seal ring or member 80 is disposed between the cylindrical wall 44 of the second casing 30 and the outer element 72 of the second sleeve member 66. Preferably also, the rubber portion of the seal member 80 is adjacent to and contacts the outer element 72. With the addition of the second seal member 80, together with the first seal member 78, an enclosed unit is provided. Consequently, grease or other appropriate lubricants can be received into the carrier bearing assembly 10, namely, by means of the grease fitting or zirc 42, the ball bearing assembly 60 receives the desired lubricant. That is, the ball bearings can receive at appropriate time intervals the necessary lubricant or lubricants for maintaining proper ball bearing operation and for increasing the worthwhile life expectancy of the carrier bearing assembly 10.

In conjunction with fitting or connecting the carrier bearing assembly 10 to the two drive shaft sections 12, 14, as can be readily appreciated, the end of the drive shaft section 12 is inserted into and contacts the inner surface of the sleeve member 64 while the end of the second drive shaft section 14 is inserted into and contacts the inner surface of the second sleeve member 66. Because of the increased thickness of each of the two outer elements 68, 72, the user or installer is able to strike or hit such outer elements 68, 72 in properly securing the carrier bearing assembly to the drive shaft sections 12, 14. It should be understood that the outer elements 68, 72 are made of a material to permit such striking or pounding without damage to the sleeve members 64, 66.

Based on the foregoing description of the preferred embodiment, a number of salient features of the present invention are readily noted. A longer-lasting carrier bearing assembly has been devised that permits easy assembly and lubrication of the ball bearings. The housing includes a pair of casings for use in forming a secure container for receiving the ball bearings and the necessary lubricants. A grease fitting is provided through a port in one of the casings to permit easy access for supplying the necessary lubricants to the ball bearings. Additionally, at least one hard metal sleeve member is included with a thicker portion to facilitate installation of the invention because the user can strike the thicker portion without damaging it.

Although the present invention has been described with reference to a particular embodiment, it should be readily understood that variations and modifications can be effected within the spirit and scope of this invention.

What is claimed is:

1. A carrier bearing assembly adapted to be connected to a vehicle for use in supporting and interconnecting a pair of drive shaft sections, said carrier bearing assembly including:

a first casing having an annular member and a wall extending from said annular member, said annular member defining a bore, said first casing also having a port and a recess defined by said annular member and said wall;

a grease fitting received in said port of said first casing and connected thereto;

a second casing, non-integral with and separate from said first casing, said second casing having an annular member and a wall extending from said annular member, said annular member defining a bore, a recess being defined by said annular member and said wall;

race means having a first portion and a second portion, a first portion of said race means being received into said recess of said first casing and said second portion of said race means being received into said recess of said second casing;

bearing means located adjacent to said race means;

at least a first sleeve member disposed adjacent to said race means for receiving at least one of the drive shaft sections; and sealing means disposed between said sleeve member and one of said first casing or second casing for use in preventing contaminants from entering past said one casing and for use in containing a lubricant used by said bearing means.

2. A carrier bearing assembly, as claimed in claim 1, wherein:

said race means includes an outer race and said first casing and said second casing are contiguously adjacent to each other along said outer race.

3. A carrier bearing assembly, as claimed in claim 1, wherein:

said first sleeve member includes an outer element and an inner element, said outer element having a greater thickness than said inner element and being located outwardly of said bearing means.

4. A carrier bearing assembly, as claimed in claim 1, further including:

a second sleeve member, separate from said first sleeve member, said second sleeve member being positioned contiguously adjacent to said first sleeve member.

5. A carrier bearing assembly, as claimed in claim 4, wherein:

said sealing means includes a first sealing ring located between said first casing and said first sleeve member and a second sealing ring located between said second casing and said second sleeve member.

6. A carrier bearing assembly, as claimed in claim 3, wherein:

said race means includes an outer race and an inner race and said outer element abuts against a surface of said inner race.

7. A carrier bearing assembly, as claimed in claim 2, wherein:

said recess corresponds to about one-half of the width of said outer race.

8. An apparatus used with a vehicle, comprising:

a clamp assembly adapted to be connected to the frame of a vehicle;

an elastic mounting assembly including an opening and having at least portions thereof in engagement with portions of said clamp assembly;

a carrier bearing assembly positioned in said opening of said rubber mounting, comprising:

a first casing having a wall and an annular member connected to said wall, said annular member defining a bore formed through said first casing, said first casing further having a port formed through said annular member, and a recess being defined by said annular member and said wall, a grease fitting held in said port of said annular member for receiving lubricant, a second casing, separate from and non-integral with said first casing, said second casing having a wall and an annular member and a wall connected to said wall, said annular member defining a bore formed through said second casing, and a recess being defined by said wall and said annular member, a first sleeve member having a diameter of a size to receive a first drive shaft section, said first sleeve member including an outer element and an inner element, said outer element being thicker than said inner element, an outer race having a first portion received by said recess of said first casing and a second portion received by said recess of said second casing, an inner race concentric with and spaced from said outer race, a second sleeve member having a diameter of a size to receive a second drive shaft section, ball bearing means disposed between said outer race and said inner race and having a number of ball bearings for contacting and movement along surfaces of said outer race and said inner race, sealing means held adjacent to said first casing and said second casing for use in preventing contaminants from entering said ball bearing means and for securing the containment of the lubricant in the carrier bearing assembly;

a first drive shaft section received and supported by said first sleeve member; and a second drive shaft section received and supported by said second sleeve member.

* * * * *